United States Patent

[11] 3,556,434

[72] Inventor Edward P. Koeppe
Santa Monica, Calif.

[21] Appl. No. 825,711
[22] Filed May 19, 1969
[45] Patented Jan. 19, 1971
[73] Assignee Audio Magnetics Corporation
Gardena, Calif.
a corporation of California

[54] CASSETTE LINER
12 Claims, 7 Drawing Figs.

[52] U.S. Cl. 242/199
[51] Int. Cl. G11b 23/08
[50] Field of Search 242/197, 198, 199, 200, 194, 71.1, 71.2; 352/72, 78; 274/4, 11; 179/100.2(2)

[56] References Cited

UNITED STATES PATENTS

| | | | |
|---|---|---|---|
| 2,937,818 | 5/1960 | Zorn | 242/199 |
| 2,988,295 | 6/1961 | Loewe | 242/199 |
| 3,027,110 | 3/1962 | Andrews | 242/210 |

*Primary Examiner*—George F. Mautz
*Attorney*—White and Haefliger

ABSTRACT: The disclosure concerns the provision, within a magnetic tape cassette case, of a thin sheet which contains zones presenting low-friction tape-guiding surfaces to tape feeding onto and off tape rolls, and a transparent third zone extending in underlying proximity to a viewing window in the cassette wall.

PATENTED JAN 19 1971

3,556,434

INVENTOR.
EDWARD P. KOEPPE

BY White & Haefliger

ATTORNEYS.

CASSETTE LINER

BACKGROUND OF THE INVENTION

This invention relates generally to tape cassettes, and more particularly concerns simplification of cassette assembly construction in conjunction with the control and viewing of magnetic tape winding in such cassettes.

Tape cassettes typically include a hollow case and a pair of magnetic tape winding reels mounted in the case to be turned when the cassette is removably mounted in playback equipment. The problem of determining the extent of winding of the tape on either reel can be met by providing a window in the cassette case; however, in order to prevent dirt and other foreign matter from entering the case, its it was thought necessary in the past to provide a clear plastic insert attached to the case wall to cover the window opening in that wall. Such attachment of the insert to the wall represents an extra production step and adds to the cost of the cassette assembly.

Another problem has been that of control of tape travel, it being desirable that minimum braking effect be exerted on the tape as it travels between the reels. A further problem has been that of winding stability, it being desired that the tightness of the winding on the reel decrease as the roll radius increases, (to compensate for the effect of tape drag increase as the roll diameter increases). Finally, there is the problem of inaccurate winding of the tape on the reels.

SUMMARY OF THE INVENTION

It is a major object of the invention to provide simple solutions to the above as well as other related problems through the provision of a multiple function device inserted, or to be inserted, into a cassette or cartridge housing to permit visual observation of the tape packs or rolls through the case window, while at the same time blocking dirt from entering the case interior via the window; to facilitate drain of static electrical charge; to reduce frictional braking effect on the tape during its transport between the rolls or packs; and to facilitate desirable guiding of the tape during such transport.

Basically, the environment of the invention is a magnetic tape assembly incorporating a case having spaced walls and a pair of tape-supporting annular reels rotatable within the case to unwind tape off a roll on one reel and wind tape onto a roll on the other reel, there being space between the rolls and at least one of the walls. Further, the case contains openings to receive drive posts for centrally rotating the reels, and a window located to enable viewing of the extent of tape winding on the rolls.

The invention embodies, within this environment, a thin sheet extending in the defined space and having openings therethrough to register with the case openings, the sheet having three characteristic zones. Two of the latter present low friction surfaces to tape feeding onto and off the rolls, while the third zone is transparent and extends in such underlying proximity to the window in the case as to afford viewing of the extent of tape winding on the rolls while at the same time blocking direct access of foreign matter to the tape in the case. As will be seen, the window need not contain a separate clear plastic insert attached to the case; and the sheet may consist of flexible plastic material such as polyester, acetate or polyvinylchloride film locally coated at the first and second zones with a lubricant such as graphite to provide the low-friction tape-guiding surfaces. Further, two of such sheets, inserted into the cassette at the time of assembly, provide multiple desired functions enhancing utility and operation of the cassette by the user as well as its longevity.

Other objects of the invention include the provision of flat sheets as described with thickness less than about 0.010 inches; and the interfitting of such a sheet with shoulders on the cassette wall in such manner that the sheet is retained in centered position, housing of the sheet also being maintainable if desired, by such shoulders, as will be described.

These and other objects and advantages of the invention, as well as the details of an illustrative embodiment, will be more fully understood from the following detailed description of the drawings, in which:

DESCRIPTION OF THE PREFERRED EMBODIMENT

Figures 1, 2, 3, 4, 5, 6, 7:
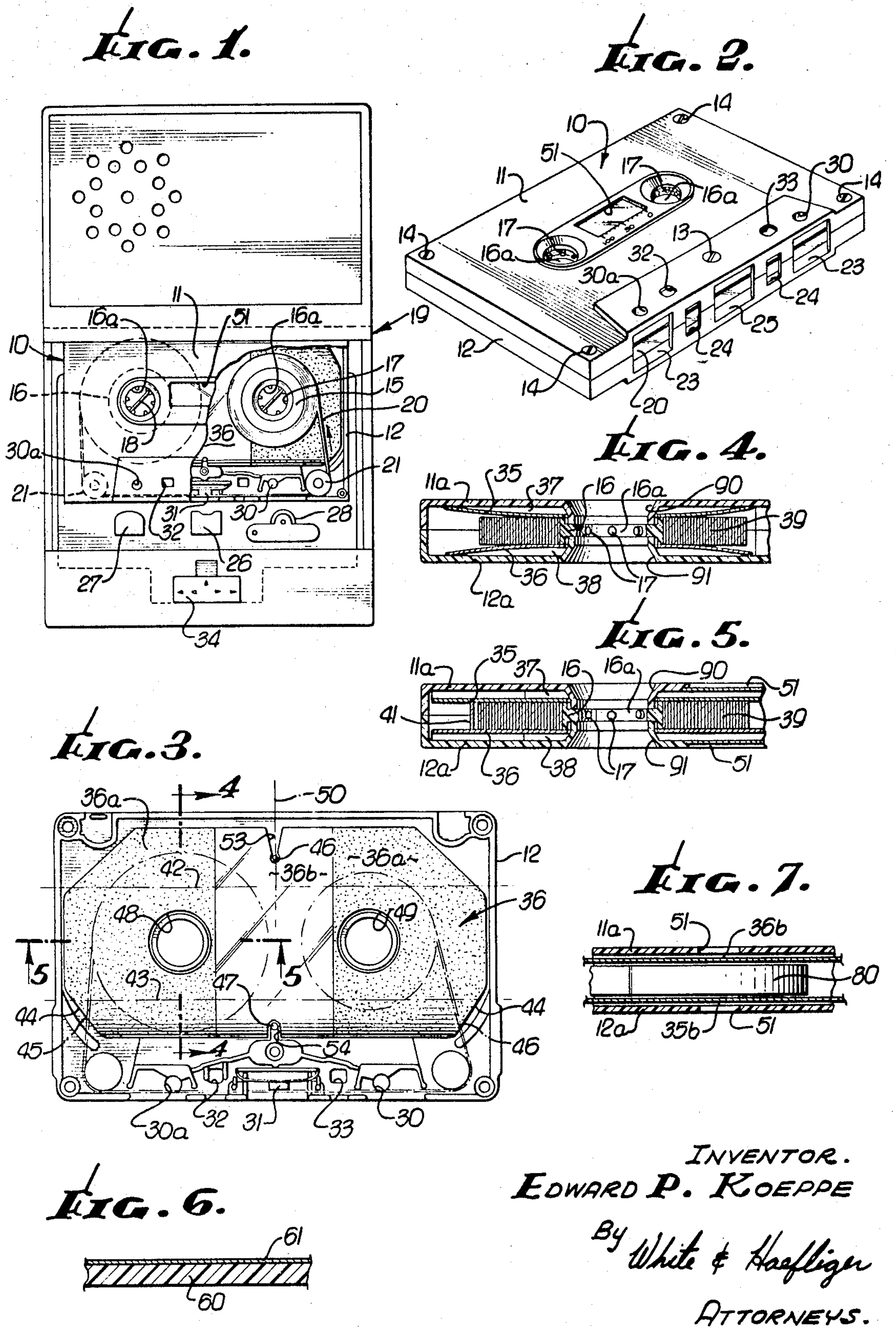
FIG. 1 is a plan view showing the relationship of the cassette to playback equipment.
FIG. 2 is a perspective view of the FIG. 1 cassette.
FIG. 3 is an enlarged plan view of the cassette interior with a bowed sheet therein.
FIGS. 4 and 5 are enlarged sections taken on lines 4—4 and 5-5 of FIG. 3.
FIG. 6 is a fragmentary section taken through the bowed sheet.
FIG. 7 is an enlarged fragmentary section showing the relationship of flat sheets to case wall windows.

Referring first to FIGS. 1 and 2, the tape cassette is shown to include a hollow case 10 having upper and lower case sections 11 and 12 which are suitably attaChed attached together as by the fasteners 13 and 14. Mounted in the case are a pair of winding reels 15 and 16, suitable annular flanges in the case sections supporting the reels for rotation. The reels are themselves annular to form central openings **16*a* into which the lugs 17 on the reels project inwardly toward the axes of rotation, as shown. These lugs interfit a driving element shown at 18 in FIG. 1, and which is a part of the playback unit 19. Accordingly, during playback the tape 20 is wound on the reel 15, as shown, in response to rotation of the driving element 18**.

Also contained within the case are two idler rolls 21 about which the tape travels during advancement thereof. In this regard, the case has an elongated opening along one edge thereof to expose tape traveling lengthwise along said edge. FIG. 2 shows the elongated opening in the form of sections 23, 24 and 25 through which the tape is exposed to the exterior during tape travel between the rollers 21. In this regard, when the cassette is mounted on the playback equipment 19, the tape is exposed to a magnetic read/write head 26 opposite opening 25, an erase head 27 opposite an opening 23 and an idler roller 28 opposite the other opening 23. In this regard, the heads 26 and 27 and the roller 28 are relatively movable into engagement with the tape proximate the openings 23 and 25 in order to enable operation of the equipment. Similarly, these elements are movable relatively away from the tape to facilitate mounting and demounting of the cassette in the playback equipment. Aligned openings 30 in the case are adapted to receive a rotary capstan immediately behind the tape for driving the latter when the idler roller 28 urges the tape into contact with the capstan. A similar pair of aligned openings appear at **30*a*** for the same use when the cassette is turned over for driving the tap tape in the opposite direction.

A spring urged support 31 is located inwardly of the tape and opposite the magnetic head 26, the support being carried by the cassette and typically consisting of a piece of soft felt. The support serves as a backup for the tape when the magnetic head is brought into contact with the opposite side of the tape. Finally, two pairs of aligned openings 32 and 33 are found in the case to receive posts for locating and locking the cassette in place under upon the playback equipment 19. A manual control is shown at 34 and is operable to effect displacement of the heads 26 and 27 and roller 28 relatively into engagement with the tape and to initiate and stop advancement of the tape as described.

FIGS. 3—5 show first and second thin sheets 35 and 36 extending in the spaces 37 and 38 between the roll 39 and the case walls **11*a* and 12*a*. The sheets may have bowed portions, as for example may have the curvature as seen in FIG. 4, which project toward the opposite sides or roll 39, such bowed portions being sufficiently resiliently urged toward the roll as to engage those opposite sides of the roll and also the opposite edges of the roll and also the opposite edges of the tape section 41 extending from the roll as seen in FIG. 5. With such light pressural engagement thus afforded, tracking movement of the tape section 41 is guided relative to the roll, whereby the tape may be accurately wound on the roll, with stability as referred to in the introduction. The bowed portion in contact with the roll sides and tape may be of a width defined by the lateral spacing of longitudinal lines 42 and 43 in FIG. 3, those lines also indicating that the bowed portion is longitudinally elongated to engage both rolls, as described, so that guided tracking is accomplished for both directions of winding. Thus, the tape floats between the two sheets, within limits imposed by the looseness of fit between the reels 15 and 16 and the inturned annular flanges 90 and 91 of the case sections. Note further that the tape is kept spaced from the peripheral edges 44 of the sheets 35 and 36, which are outside the zone defined between lines 42 and 43, whereby the tape which crosses those edges (at locations indicated by broken lines 45 and 46**) cannot feed under the sheets.

Each of the sheets has interfitting relation with shoulders on the case, whereby the sheet remains centered and in bowed condition, as described. One advantageous form of such shoulders is illustrated by the laterally spaced posts 46 and 47 upstanding from each of the case sections 11 and 12. Posts 46 and 47 are on a lateral axis 50 midway between the reel openings 48 and 49 in the sheet, that axis crossing a window opening 51 in the case through which the tape rolls may be viewed. The sheet is notched at 53 and 54, inwardly from its laterally opposite edges, to receive the posts with interference. Such interference tends to hold the sheet to the posts and case section, whereby the latter may be freely manipulated, and turned upside down during assembly, without causing the sheet to separate from the case sections.

An important aspect of the invention concerns the provision on each sheet 35 and 36 of three zones, the first and second of which are characterized as presenting low-friction surfaces to the tape feeding onto and off the tape rolls or packs, and a transparent third zone extending in closely underlying proximity to the adjacent viewing window 51. Accordingly, the window 51 need not contain any separate clear plastic insert for protection purposes.

As seen in FIG. 3, the first and second zones appear at **36*a* at opposite sides of the third zone 36*b* the width of which exceeds the length of the open case window 51. In this regard, the sheet 36 may consist of a clear polyester, acetate or polyvinylchloride film, and the zones 36*a* may have thin coatings of a lubricant such as graphite or other material, the zones 36*a* then being opaque. As a result, the restraining effect of the sheets on the tape edges in engagement with zones 36*a*** is reduced to a minimum.

As regards such coatings, FIG. 6 shows form of sheet construction found to be particularly advantageous. That sheet comprises a thin backer 60 on which thinner coating 61 of electrically conductive and low-friction material is formed. One such coating consists of graphite particles in a suitable binder such as vinyl, and the backer may consist of a clear plastic film. The overall thickness of the sheet is less than about 0.010 inches and the graphite coating may be about 0.0002 inches thick. As mentioned, the coating 61 engages the tape and dissipates any electrical charge over a wide area and also reduces tape drag.

Finally, the coated sheet may be given its curvature by heating to softening temperature (220°—220° F. in the case of polyester) while curved, held at that temperature for a few minutes, and thus cooled, whereby such curvature or bow is made permanent.

If desired, the sheets 35 and 36 may be flat. FIG. 7 illustrates the proximity of the transparent central zones **35*b* and 36*b* of flat sheets 35 and 36 to the windows 51 in the opposite walls 11*a* and 12*a* of the case. In that view, a tape roll or pack on one of the reels appears at 80**.

I claim:

1. In a magnetic tape assembly including:

a. a case having spaced walls;
b. a pair of tape-supporting annular reels rotatable within the case to unwind tape off a roll on one reel and wind tape onto a roll on the other reel, there being space between the rolls and at least one of the walls; and
c. the case having therein openings to receive drive posts for centrally rotating the reels, and a window located to enable viewing of the extent of tape winding on the rolls, the improvement comprising:
d. a thin sheet extending in said space and having openings therethrough to register with the case openings, the sheet having first and second zones characterized as presenting low-friction surfaces which are generally protuberant toward tape feeding onto and off said rolls, said surfaces being formed by low-friction coating on the sheet; and
e. the sheet having a transparent third zone located between said sheet openings and extending in closely underlying relation to said window.

2. The combination of claim 1 wherein the window is open and said sheet consists of plastic material extending adjacent the underside of said window.

3. The combination of claim 1 including a second sheet in a space between the rolls and the other of said walls, the second sheet being like the first mentioned sheet.

4. The combination of claim 1 wherein said first and second zones are opaque.

5. The combination of claim 1 wherein said through openings pass through said first and second zones.

6. The combination of claim 1 wherein the sheet is bowed to cause said first and second zone surfaces to engage the tape rolls on the reels.

7. The combination of claim 1 wherein the sheet is flat.

8. In a magnetic tape assembly including:

a. a case having spaced walls;
b. a pair of tape-supporting annular reels rotatable within the case to unwind tape off a roll on one reel and wind tape onto a roll on the other reel, there being space between the rolls and at least one of the walls;
c. the case having therein openings to receive drive posts for centrally rotating the reels, and a window located to enable viewing of the extent of tape winding on the rolls, the improvement comprising:
d. a thin sheet extending in said space and having openings therethrough to register with the case openings, the sheet having first and second zones characterized as presenting low-friction surfaces to tape feeding onto and off said rolls;
e. the sheet having a transparent third zone extending in closely underlying relation to said window;
f. the sheet being bowed to cause said first and second zone surfaces to engage the tape rolls on the reels; and
g. there being shoulders on one of said walls and presented toward the cassette interior and the sheet having interfitting relation with said shoulders to maintain the sheet in said bowed condition.

9. The combination of claim 1 wherein the sheet overall thickness is less than 0.010 inches.

10. For combination in a magnetic tape assembly that includes a case having spaced walls and a pair of tape roll supporting reels rotatable within the case by drive posts to unwind tape off a roll on one reel and wind tape onto a roll on the other reel, there being space between the rolls and a wall of at least one section, the improvement comprising a thin sheet sized to be peripherally confined in said space and having openings therethrough to pass the drive posts, the sheet having first and second zones characterized as presenting low-friction surfaces to tape feeding onto and off said rolls, the surfaces being defined by low-friction coating of the sheet, and the sheet also having a transparent third zone located between said openings and separating said first and second zones to closely underlie a case wall window, the sheet having opposed edge portions which are perforated to receive shoulder means on the case to position the sheet in the case.

11. The sheet of claim 10 having overall thickness less than 0.010 inches, and wherein said first and second zones are opaque and lie at opposite sides of said third zone.

12. The improvement of claim 10 wherein one perforated edge portion of the sheet forms a notch tapering toward and terminating at a perforation shaped to receive a post on the case.